Figure 1:
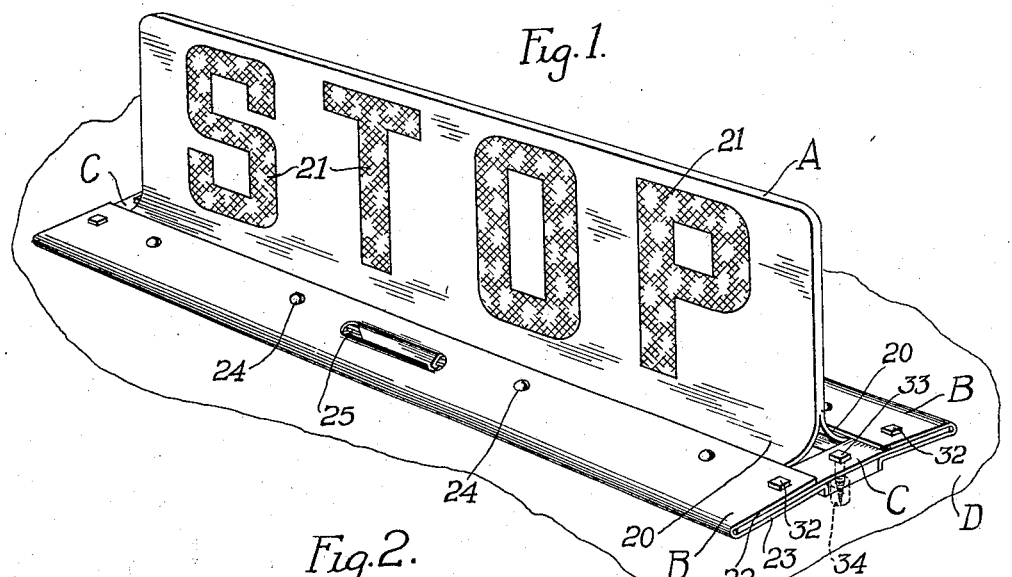

April 22, 1930.  M. E. HARTZLER ET AL  1,755,443
UPRIGHT HIGHWAY MARKER
Filed April 15, 1929    3 Sheets-Sheet 1

INVENTORS.
Melvin E. Hartzler, and
Edgar P. Romilly
BY Thomas H. Ferguson
ATTORNEY.

April 22, 1930.  M. E. HARTZLER ET AL  1,755,443
UPRIGHT HIGHWAY MARKER
Filed April 15, 1929   3 Sheets-Sheet 2
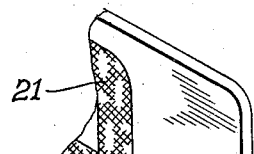
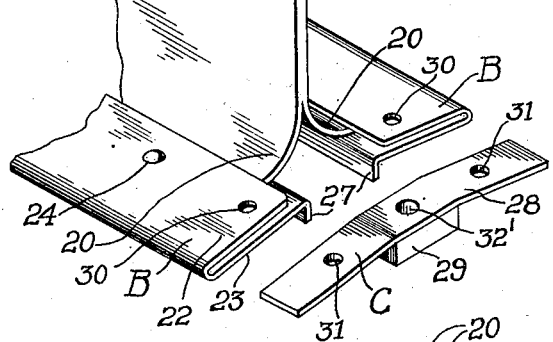
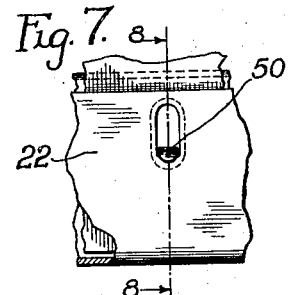
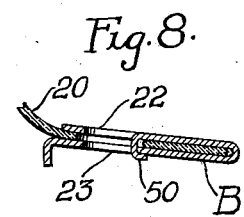
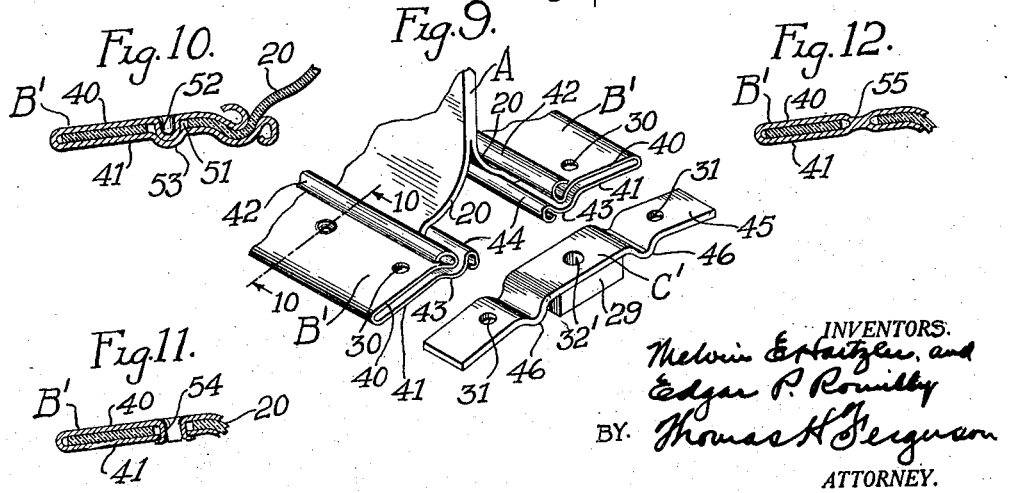
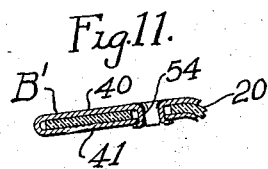
INVENTORS.
Melvin E. Hartzler, and
Edgar P. Romilly
BY Thomas H. Ferguson
ATTORNEY.

April 22, 1930.  M. E. HARTZLER ET AL  1,755,443
UPRIGHT HIGHWAY MARKER
Filed April 15, 1929   3 Sheets-Sheet 3
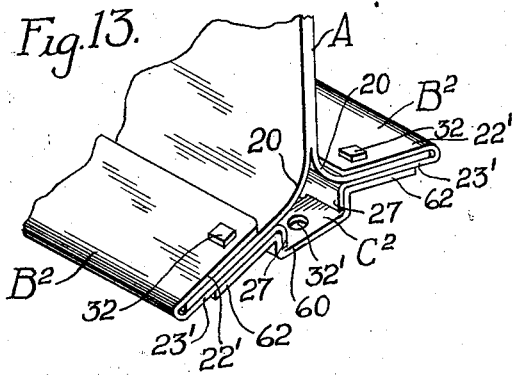
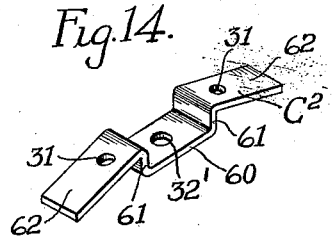
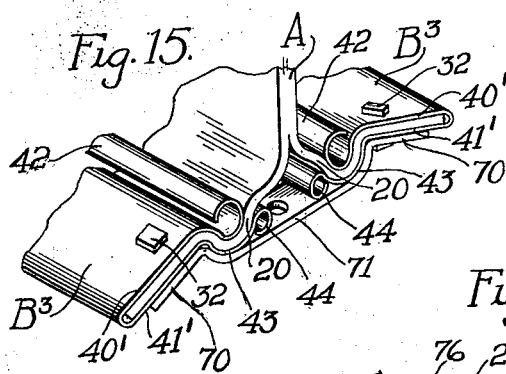
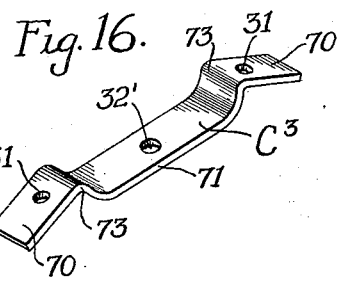
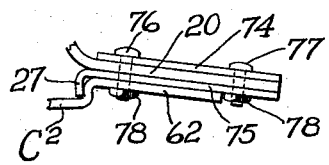
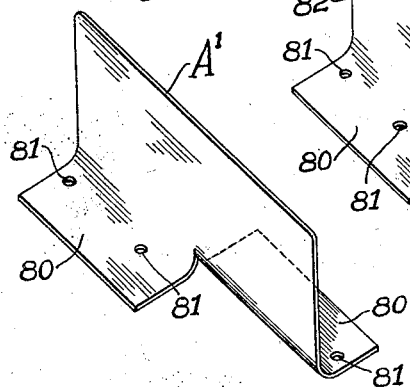
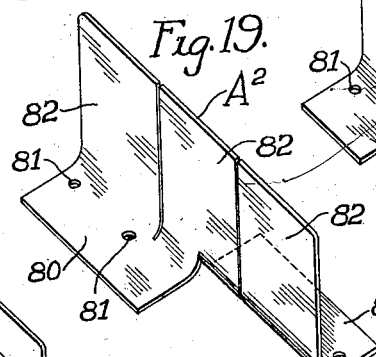
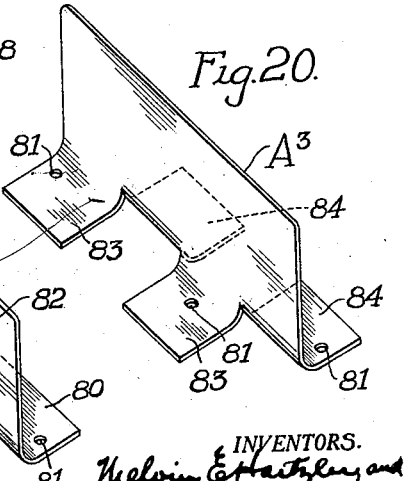
INVENTORS.
Melvin E. Hartzler, and
Edgar P. Romilly
BY Thomas H. Ferguson
ATTORNEY.

Patented Apr. 22, 1930

1,755,443

UNITED STATES PATENT OFFICE

MELVIN E. HARTZLER, OF DOWNERS GROVE, AND EDGAR P. ROMILLY, OF CHICAGO, ILLINOIS

UPRIGHT HIGHWAY MARKER

Application filed April 15, 1929. Serial No. 355,302.

The present invention relates to yielding upright highway markers of the class wherein a blade of rubber, or like material, has its lower portion divided so as to provide a plurality of anchoring sheets which are joined to a substantial base of metal or like material.

In markers of this class heretofore proposed, the assembled blade and base constitute a bulky structure. When the parts are assembled at the point of manufacture, the cost of shipping is considerable because of the bulkiness. On the other hand, if the parts be assembled at the point of installation, then there is the high cost due to the necessity of having skilled labor at the installation point. The principal objects of the present invention are to overcome these objections by producing a new structure which may be almost completely assembled at the manufacturing point, and will therefore require little assembly work at the point of installation, and which will be at the same time readily foldable into compact compass for handy and economical shipping.

In prior art markers of the class in view, the metal of the base has been given a central downward bulge to provide a space into which the bent rubber of the blade, or more properly perhaps of the anchoring sheets, may pass when the blade is flattened down by the traffic. The space thus provided is small and cannot well be enlarged without providing a cavity in the pavement to receive the still greater bulge of the metal, in case the old design be followed. Another object of the invention is to enlarge the space available to the bent rubber without requiring any cutting or modifying of the surface of the pavement.

Other objects of the invention are to provide a marker of the class described of simple, durable, and economical construction.

With these ends in view, we preferably construct the base of two principal parts, one for each anchoring sheet, or set of anchoring sheets, of the upright blade. These base portions are in the form of plates which are secured to the anchoring sheets of the blade at the manufacturing plant. When forming the base in this way by combining two base plates, the structure thus far assembled may be laid substantially flat, and when thus laid may be easily packaged for shipment. Then at the installation point, the base plates are laid flat on the pavement with the indicating blade extending upward, and the ends of the plates are secured together by keepers which hold the assembled structure in proper position. Preferably anchor bolts secure the keepers to the pavement, and in this way the entire marker is held in place. There may be instances, however, where the use of anchor bolts, or like fastening devices, is not necessary or desirable. It will be noted that when the base plates are thus assembled, there is quite a large space between their adjacent edges into which the bent rubber of the blade anchor sheets may pass. The keepers secure the plates at points beyond the ends of the blade, and, consequently, do not interfere with the passage of the bent rubber into the space provided between the base plates. This space has for its bottom limit the surface of the pavement itself. Furthermore, by making the base plates of rolled metal sheets or strip, and connecting them to the blade bifurcations by simple welding, or like operations, it is possible to reduce the cost of the marker to a minimum without any resulting disadvantages.

The several objects and features of our invention will be more fully understood upon reference to the following detailed description, taken in connection with the accompanying drawings, while the scope of the invention will be particularly pointed out in the appended claims.

Figure 2:
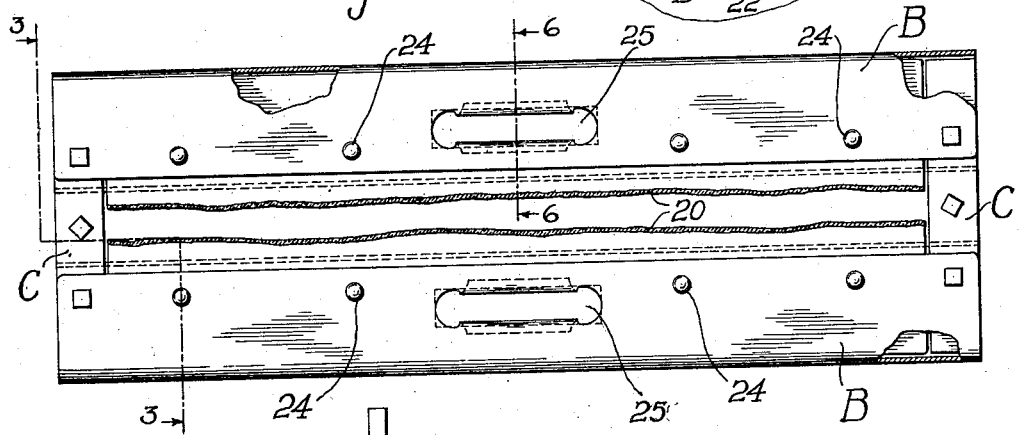
Figure 3:
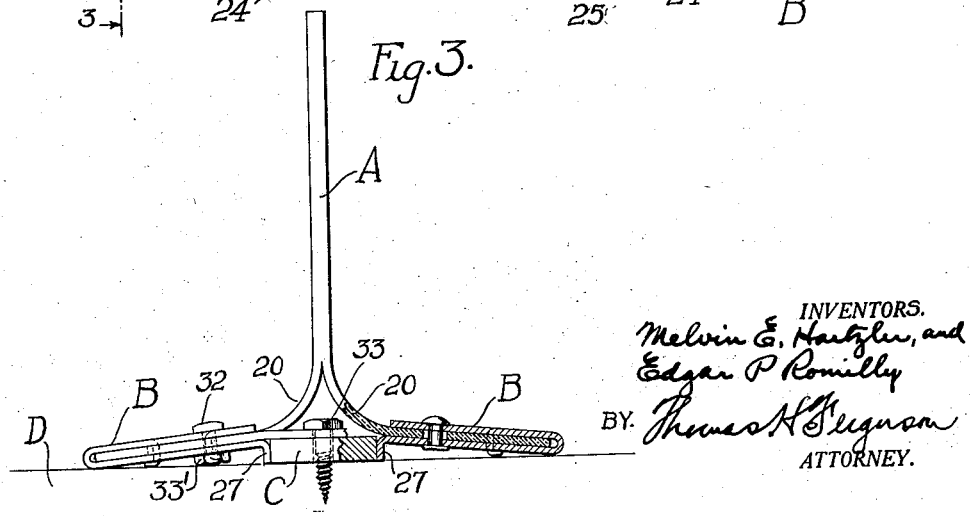

In said drawings, Fig. 1 is a perspective view of a highway marker constructed in accordance with the present invention; Fig. 2 is a plan view of the same, the upper indicating portion of the blade being broken away; Fig. 3 is an end view with one-half of the base shown in section, the plane of section being indicated by the line 3—3 of Fig. 2; Fig. 4 is a fragmentary perspective view illustrating more particularly the ends of the base plates and the associated keeper just before being put into assembled position;

Fig. 5 is a view of the marker with the keepers removed and the end plates brought together side by side in substantial alignment with the upper or indicating portion of the blade; Fig. 6 is a sectional view illustrating the manner of finishing the hand holes by which the marker is readily carried, the plane of section being indicated by the line 6—6 of Fig. 2; Fig. 7 is a fragmentary plan view illustrating a modified method of connecting the two leaves of one of the base plates; Fig. 8 is a sectional view of the same modification, the plane of section being indicated by the line 8—8 of Fig. 7; Fig. 9 is a fragmentary perspective view, similar to Fig. 4, of a modification of base plates and keeper construction wherein lighter stock is used and the plates are somewhat differently formed; Fig. 10 is a sectional view of one of the base plates indicating a modified ball and socket union of the leaves of the plate, the plane of section being indicated by the line 10—10 of Fig. 9; Fig. 11 is a similar view illustrating a further modification wherein the stud is broken through so as to provide an eyelet for connecting the two leaves of one of the base plates; Fig. 12 is a similar view illustrating a spot welded connection of the two leaves; Fig. 13 is a fragmentary perspective view, similar to Fig. 4, illustrating the structure of that figure provided with a base of the same length as the blade; Fig. 14 is a perspective view of the keeper used in the structure of Fig. 13; Fig. 15 is a perspective view illustrating the structure of Fig. 9 shortened to provide a base and a blade of the same length; Fig. 16 is a perspective view of the keeper used in the structure of Fig. 15; Fig. 17 is an elevation illustrating a base having separate upper and lower leaves; and Figs. 18, 19 and 20 illustrate different ways of cutting the blade to provide the anchoring sheets and also divided indicating portions. Throughout these views like characters refer to like parts.

Referring to the drawings in detail, A designates the main indicating blade, B the base plates to which the lower bifurcated portions of the blade A are secured, C the keepers at the ends of the blades B, and D the pavement to which the keepers, and hence the marker, are attached.

The blade A is composed of a flexible resilient weatherproof material, such as vulcanized rubber compounded to be of a toughness corresponding to that employed in tire treads and vulcanized either with or without textile or other reinforcements therein. The lower portion of the blade A is bifurcated by a lengthwise split to form two base sheets 20, which serve as anchoring sheets for anchoring the blade to the base. Indeed, the entire blade may be made by taking two separate sheets of the thickness of the bifurcated portions 20 and vulcanizing them together to form the double thickness of the upper portion of the blade A. Obviously, the blade B and its bifurcated base sheets may be made up in different ways. The upper portion of the blade A forms the background of the letters or other indicating symbols 21 upon its face and is preferably black. The symbols 21 are preferably given a color which has the best visibility under all circumstances of service. This is usually a federal yellow, orange, or chrome orange. The designating character is formed at the same time that the blade is formed and, consequently, is integral with it. The material employed in making the blade A should be highly resilient, so that when made in the thin panel illustrated it will promptly resume its upright position following each flattening by the blows of the traffic, and will so continue to act for a long period of service.

The base of the marker is composed of the two base plates B and the two keepers C. Each plate B comprises an upper leaf 22 and a lower leaf 23. These leaves are formed by taking a flat strip of metal and bending it along a longitudinal axis until the two leaves 22 and 23 approach each other. Then the corresponding anchoring sheet 20 of the blade A is inserted between the leaves 22 and 23. The latter are then secured together at intermediate points. Various connecting means may be employed for this purpose. In the form of the invention illustrated in Fig. 1, the leaves 22 and 23 are connected by rivets 24. Obviously, to receive these rivets the leaves 22 and 23 must be punched with rivet holes. In like manner there must be a hole through the sheet 20 at each point where a rivet is to go. In forming the hand holes 25 any suitable construction may be employed. Preferably, however, the lower leaf 23 has an elongated opening which is made the exact size of the hand hole. Then the upper leaf 22 is cut at its ends to match the hole in the leaf 23 and the intervening portion of the leaf 22 between the ends is cut longitudinally so as to provide two portions 26 which are bent down and extended through the hole in the leaf 23 and then turned over the adjacent edges of the hole to form a smooth interior, all as illustrated more particularly in Fig. 6. Each leaf 23 of the blades B has a downwardly extending flange 27. When positioned on the pavement D, the outer edges of the blades B and the flanges 27 engage the pavement and leave a space underneath for the heads of the rivets or other fastening means by which the leaves of each plate are connected.

It will be seen that the blade A and the base plate B can be manufactured and assembled in the manner hereinbefore described in the manufacturing plant. When the parts are thus made and assembled, the two base plates B may be folded together side by side, and when so folded will lie in substantial alignment with the upper portion of the blade A. Thus the marker, before the keepers are attached, may be folded into a flat and compact position suitable for economical packaging in a long flat carton or other holder. This folded position of the parts is illustrated particularly in Fig. 5. This construction thus enables the marker to be readily and economically shipped. The keepers are small bars which may be readily positioned in the package without materially increasing its dimensions.

When the parts are to be assembled, the plates B are drawn out so as to be in substantial alignment, and when in this position the keepers C are attached. There is one such keeper at each end of the marker. Preferably the plates B extend beyond the end of the blade A and the additional space is used for securing the keeper to the blades. In the embodiment illustrated in Figs. 1 and 4, the keeper C is in the form of a bar 28 secured at its center to the upper side of a block 29 and sloped downward on either side of the block with an inclination corresponding to that of the leaves 22 and 23 between which the ends of the keeper are slipped. When the bar 28 is in position between the leaves 22 and 23 of each of the plates B, the block 29 engages the opposing faces of the flanges 27. When in this position, the keeper C is firmly secured to the plates B. For this purpose the leaves of each plate B are perforated at 30, and the ends of the keeper C are correspondingly perforated at 31. Through these perforations a machine bolt or screw 32 passes. A nut 33' upon the bolt 32 serves to firmly secure the parts together. The center of the keeper C, including the block 29, is provided with an opening 32' through which an anchor bolt 33 extends into the pavement D. Various forms of anchor bolts may be used for securing the keepers, and hence the marker, to the pavement. In the instance illustrated, the headed bolt 33 is screwed down into a lead washer or sleeve 34. Ordinarily, the pavement is first drilled and the lead washer is set in place in the drilled hole. Then the screw bolt is screwed into the lead or into a nut contained in the same. These anchor bolt arrangements are common and need not be more fully described.

From what has been said, it will be seen that little work is required in assembling the marker at the point of installation. It is only necessary to put the keepers in place and connect the parts by the bolts 32; then to secure the marker to the pavement the bolts 33 or other anchoring devices must be applied. In case it becomes necessary to remove the marker, it is only necessary to withdraw the bolts 33, or cut them off. Then, the entire marker may be lifted up free of the pavement. In case it is desired to collapse it, after being removed from the pavement, it is only necessary to remove the bolts 32 and withdraw the keepers C. Then all the parts may be packed into a space of small compass, as heretofore indicated.

In the form of the invention illustrated in Figs. 1 and 4, the base plates B are made up of a flat strip or sheet of metal folded by suitable machinery to furnish the leaves 22 and 23 and the flange 27. Commonly, No. 12 gauge strip would be used for manufacturing the plates B. As a modification of the invention, we have shown in Fig. 9 base plates B' composed of somewhat lighter material, such as No. 16 gauge, and these are shaped by rolling the metal in the same manner that window strips and other like shapes are rolled. In this instance there are the upper and lower leaves 40 and 41, and the upper leaf has its inner edge formed into a curl or bead 42 for strengthening the leaf and also to provide a curved surface over which the adjacent bifurcated sheet 20 may bend. In like manner, the lower leaf 41 is curved at 43 more or less concentrically with the bead 42, and then it is provided with a bead 44. With these rounded edges at the inside of each plate B', the wear on the rubber blade is reduced over what would be the case with the more abrupt edges of the plates B previously described. The bead 44 also tends to strengthen the plate B in the same manner as bead 42.

Where the plates B' are employed, the keeper construction must be somewhat different. A suitable keeper, designated C', has the same block 29 as before, and the same central opening 32', but the bar 45 which rests upon the block 29 has at each side of the block a curved portion 46 which conforms to the curved space between the leaves 40 and 41 directly below the bead 42. The bar 45 has the outer openings 31 just as before, and these match the openings 30 in the plate B', just as in the plate B. Removable bolts connect the keepers to the plates just as before, and the keeper in turn is secured to the pavement as before described.

Now, instead of connecting the leaves of the plates B and B' by rivets, such as the rivets 24, we may employ other attaching means. One such connection is illustrated in Figs. 7 and 8. There, the two leaves 22 and 23 are connected in somewhat the same manner as the hand hole 25 is formed. One of the plates, in the instance illustrated the plate 23, has an opening through it, and then the other plate, in this instance the plate 22, has a tongue 50 formed in it, and this tongue is then bent and extended through the opening in the plate 23 and turned back against the plate 23 so as to form a clip for firmly attaching the two leaves together. In this instance, of course, the sheet 20 of the blade A must have an opening through which the tongue 50 may be passed.

Another way of connecting the two leaves, in this case leaves 40 and 41, is illustrated in Fig. 10, where the sheet 20 is provided with an opening 51, and through that opening a portion of the leaf 40 is punched downward against the leaf 41 so as to form a stud 52 and a socket 53. If the engagement of the stud 52 and the socket 53 is not sufficient to hold the parts, a soldered joint may be provided. Or, instead of solder, the punch may be extended right through the stud and socket so as to provide an eyelet 54 with its free ends turned back upon the under side of the leaf 41 in the manner illustrated in Fig. 11. Or, again, the leaves 40 and 41 may be connected by a spot weld 55 in the manner illustrated in Fig. 12. Although, in some instances, these methods of connecting the leaves are shown in connection with plates B, and in other instances in connection with plates B', it will be understood that the methods are interchangeable and may be used with the different plates, with one equally as well as with the other.

In some installations it might be rather objectionable to have the supporting base for the upright blade extend beyond the end of the blade. In such instances, modified keepers may be employed. Thus, in the case of the construction of Fig. 1, the plates B are replaced by the shorter plates $B^2$, and the keeper C is replaced by a modified keeper $C^2$. The latter is constructed of a simple bar of metal bent at its center into a channel shape having a flat central portion 60 and vertical adjacent portions 61. The outer ends 62 of the bar are inclined downward and outward. The whole construction of the keeper $C^2$ is such that the flanges 27 of the plates will slip down just inside of the vertical walls 61 of the keeper. Then the lower leaves $23^1$ of the plates $B^2$ will rest upon the inclined portions 62 of the keeper. The fastening bolt 32 now, in each instance, extends down through openings in the upper leaf $22^1$, the anchor sheet 20, the lower leaf $23^1$, and the keeper portions 62, the latter being provided with holes 31 for the bolt 32, just as in the first form of the invention. The central portions 60 of the keepers $C^2$ are provided with suitable openings $32^1$ for the passage of anchor bolts by which the entire structure may be secured to the pavement or other support, if desired.

Applying the same shortening to the base plates $B^1$ of the rolled material, we have the modified base plates $B^3$ with their upper and lower leaves $40^1$ and $41^1$. The curls or beads 42 and 43 are the same as before described. In this instance, the anchor sheets 20 extend between the upper and lower leaves of the plates $B^3$, just as before, but the plates $B^3$ rest upon the modified keeper $C^3$. The latter has downwardly and outwardly inclined portions 70 which fit against the under sides of the leaves $41^1$, and are provided with bolt holes 31 through which the securing bolts 32 pass, just as in the other embodiments of the invention. The central portion 71 of the keeper $C^3$ also has its central opening $32^1$ for the passage of the securing bolt by which the entire marker is secured to the pavement. The curved portions 73 lying between the outer inclined portions and the central flat portion 71 are curved so as to fit against the curved under surfaces of the leaves $41^1$ of the plates $B^3$.

By shortening the base plates in the manner illustrated in the cases of the plates $B^2$ and $B^3$, a shorter marker structure is provided and the same will, in many cases, be preferable to the structure wherein the plates, such as B and $B^1$, extend beyond the upright blade.

In the several forms of the invention heretofore disclosed, the upper and lower leaves of the plates B, $B^1$, $B^2$, and $B^3$, are formed by bending the material into proper shape either by rolling or otherwise. Obviously, the upper and lower leaves might be separately constructed. Such modification is illustrated in Fig. 17, where the upper and lower leaves, designated 74 and 75, engage opposite sides of the anchor sheet 20, and are bolted together by bolts 76 and 77, having suitable retaining nuts 78. The bolt 76 is slightly longer than the bolt 77 because it is, in this instance, required to pass through the inclined portion 62 of the keeper $C^2$. Obviously, with the arrangement of Figs. 1 and 9, the bolt 76 would not pass through any part of the keeper, and in such case it would be made short to agree with the bolt 77, the keeper being independently attached, as previously explained.

Again, instead of the blade A being divided by a lengthwise slit cut in its own central plane so as to divide the material into two retaining or anchoring sheets 20, as heretofore described, the blade might be modified and still give the upright indicating portion and the lower anchoring portions. Such modifications are shown in Figs. 18, 19 and 20. But these must be understood to be merely typical, as still other arrangements might be provided.

In the case of the blade $A^1$ of Fig. 18, a single sheet of uniform thickness is cut transversely near its center, and the portions separated thereby are bent outward in opposite directions to provide the anchor sheets 80. These are provided with suitable openings 81 placed at proper points for the passage of the securing bolts, rivets, welds, or like connecting means. Where split in this way, the holding plates which go to form the base of the structure would ordinarily extend the full length of the blade A, but portions of the opposing leaves would be devoid of intervening blade material. However, such a construction could be made in a satisfactory way to provide a marketable and successful marker.

As illustrated in Fig. 19, the blade A² might be of a single sheet of material similar to the blade A¹, and its lower portion might be divided in the same way to give anchor sheets 80, provided with attaching openings 81, but the upper part, instead of being left at a single blade integral throughout its length, might be divided into a plurality of sections 82 by vertical cuts extending from the top of the blade down to the point at which the anchor sheets 80 begin. With the arrangement of Fig. 19, the sections 82 would operate independently under traffic and, in some instances, one or more might be flattened out by a vehicle, while the rest remained upright.

In the modification of Fig. 20, the blade A³ is manufactured out of a single sheet of flexible material, the same as the blades A¹ and A², but like the blade A¹, it has no cuts which divide its upper portions into sections. It, however, differs from the blade A¹ in having its lower portion cut so as to provide a plurality of anchor sheets 83, 84 on each side of the plane of the blade. These sheets have suitable openings 81, just as before.

From what has been said, it will be seen that our invention may be embodied in different forms, consequently we do not wish to be limited to the exact constructions and arrangements disclosed, but aim to cover by the terms of the appended claims all those alterations and modifications which rightly come within the scope of our invention.

What we claim as new and desire to secure by a patent of the United States is:

1. A resilient upright highway marker comprising an indicating blade of flexible resilient material having its lower portion bifurcated to provide two base sheets, two base plates secured each to one of said sheets and extending lengthwise thereof, and keepers secured to the ends of said plates to space said plates and to secure said plates together as a rigid base for said blade.

2. A resilient upright highway marker comprising an indicating blade of flexible resilient material having its lower portion bifurcated throughout its length to provide two long base sheets, two base plates secured each to one of said sheets and extending lengthwise thereof, and keepers secured to the ends of said plates to space said plates on opposite sides of the normal plane of the upper portion of said blade and to secure said plates together to constitute a rigid base for said blade.

3. A resilient upright highway marker comprising an indicating blade of flexible resilient material having its lower portion bifurcated to provide two base sheets, two base plates secured each to one of said sheets and each extending lengthwise thereof beyond the ends of said blade, and keepers outward of the ends of said blade secured to the ends of said plates to space said plates and to secure them together as they extend on opposite sides of the upper portion of said blade to constitute a rigid base for said blade.

4. A resilient upright highway marker comprising an indicating blade of flexible resilient material having its lower portion bifurcated throughout its length to provide two long base sheets adapted to extend oppositely from the plane of the upper portion of said blade, two base plates secured each to one of said sheets and extending lengthwise thereof beyond the ends of said blade, and keepers outward of the ends of said blade secured to the ends of said plates to space said plates and to secure them together as they extend on opposite sides of the upper portion of said blade to constitute a rigid base for said blade.

5. A resilient upright highway marker comprising an indicating blade of flexible resilient material having its lower portion bifurcated to provide two oppositely extending base sheets, two base plates secured each to one of said sheets and extending lengthwise thereof, said blade and plates when thus assembled being foldable to bring said plates side by side in approximate alignment with the upper portion of said blade, and removable keepers adapted to be secured to the ends of said plates to space said plates and to hold them in approximate alignment at an angle to the upper portion of said blade to constitute a rigid base for said blade.

6. A resilient upright highway marker comprising an indicating blade of flexible resilient material having its lower portion bifurcated throughout its length to provide two long base sheets, two base plates secured each to one of said sheets and extending lengthwise thereof, said blade and plates when thus assembled being foldable to bring said plates side by side in approximate alignment with the upper portion of said blade, and removable keepers adapted to be secured to the ends of said plates to space said plates on opposite sides of the normal plane of the upper portion of said blade and to secure said plates together to constitute a rigid base for said blade.

7. A resilient upright highway marker comprising an indicating blade of flexible resilient material having its lower portion bifurcated to provide two base sheets, two base plates secured each to one of said sheets and each extending lengthwise thereof beyond the ends of said blade, said blade and plates when thus assembled being foldable to bring said plates side by side in approximate alignment with the upper portion of said blade, and removable keepers adapted to be secured to the ends of said plates outward of the ends of said blade to space said plates and to hold them in approximate alignment at an angle to the upper part of said blade to constitute a rigid base for said blade.

8. A resilient upright highway marker comprising an indicating blade of flexible resilient material having its lower portion bifurcated throughout its length to provide two long base sheets adapted to be extended oppositely from the plane of the upper portion of said blade, two long base plates secured each to one of said base sheets and extending lengthwise thereof beyond the ends of said blade, said blade and plates when thus assembled being foldable to bring said plates side by side in approximate alignment with the upper portion of said blade, and removable keepers adapted to be secured to the ends of said plates outward of the ends of said blade to space said plates and hold them in approximate alignment at an angle to the upper portion of said blade to constitute a rigid base for said blade.

9. A resilient upright highway marker comprising a blade of flexible resilient material having a single upper indicating portion and a plurality of lower anchoring portions in the form of sheets; base plates one for each of said anchoring portions, each of said base plates comprising upper and lower leaves pressing against the upper and under surfaces of the associated anchoring portions and fastened together; and keepers securing said base plates together in spaced relation to form therewith a pavement-engaging base for said blade.

10. A resilient upright highway marker comprising a blade of flexible resilient material having a single upper indicating panel and a plurality of lower depending anchoring sheets, base plates each having upper and lower leaves engaging the upper and under surfaces of one of said anchoring sheets, means for securing said leaves together to firmly embrace the included anchoring sheet, keeper bars fitted at the ends of said plates between the leaves of the respective plates, and means for securing said keeper bars to said plates.

11. A resilient upright highway marker comprising a blade of flexible resilient material having a single upper indicating panel and a plurality of lower depending anchoring sheets, base plates each having upper and lower leaves engaging the upper and under surfaces of one of said anchoring sheets, means for securing said leaves together to firmly embrace the included anchoring sheet, keeper bars fitted at the ends of said plates between the leaves of the respective plates, means for securing said keeper bars to said plates, and means for fastening said keeper bars to the pavement.

12. A resilient upright highway marker comprising a blade of flexible resilient material having a single upper indicating panel and a plurality of lower depending anchoring sheets, base plates each having upper and lower leaves engaging the upper and under surfaces of one of said anchoring sheets and extending lengthwise thereof and beyond the ends of said sheets, means for securing each set of said leaves together to firmly embrace the included anchoring sheet, and keeper bars positioned beyond the ends of said anchoring sheets and fitted at their opposite ends between the leaves of the respective base plates, and means for securing said keeper bars to said base plates.

13. A resilient upright highway marker comprising a blade of flexible resilient material having a single upper indicating panel and a plurality of lower depending anchoring sheets, base plates each having upper and lower leaves engaging the upper and under surfaces of one of said anchoring sheets and extending lengthwise thereof and beyond the ends of said sheets, means for securing each set of said leaves together to firmly embrace the included anchoring sheet, and keeper bars positioned beyond the ends of said anchoring sheets and fitted at their opposite ends between the leaves of the respective base plates, means for securing said keeper bars to said base plates, and means for securing said keeper bars to the pavement.

14. A resilient upright highway marker comprising a blade of flexible resilient material having a single upper portion and a plurality of lower depending anchoring portions, base plates each having upper and lower leaves engaging the upper and lower sides of the associated anchoring portion, means for securing said leaves together in the case of each base plate to firmly embrace and secure the included anchoring portion, keeper bars having central blocks for resting on the pavement to properly space said base plates, and means for securing said bars to said plates.

15. A resilient upright highway marker comprising a blade of flexible resilient material having a single upper portion and a plurality of lower depending anchoring portions, base plates each having upper and lower leaves engaging the upper and lower sides of the associated anchoring portion, means for securing said leaves together in the case of each base plate to firmly embrace and secure the included anchoring portion, keeper bars having central blocks for resting on the pavement to properly space said base plates, and means for securing said bars to said plates, said blocks having openings therethrough for the reception of anchor bolts to secure the bars and hence the marker to the pavement.

16. A resilient upright highway marker comprising a blade of flexible resilient material having a plurality of lower anchoring portions in the form of sheets; base plates for said anchoring portions, each of said base plates comprising connected upper and lower leaves embracing the associated anchoring portions; and keepers for securing said base plates together in spaced relation to form therewith a base for said blade.

17. A resilient upright highway marker comprising a blade of flexible resilient material having a plurality of lower anchoring portions in the form of sheets; base plates for said anchoring portions, each of said base plates comprising connected upper and lower leaves embracing the associated anchoring portions; keepers for securing said base plates together in spaced relation to form therewith a base for said blade, and means for securing said keepers to the pavement.

18. A resilient upright highway marker comprising a blade of flexible resilient material having a plurality of lower anchoring portions in the form of sheets, base plates for said anchoring portions, each of said plates comprising connected upper and lower leaves embracing and firmly securing the associated anchor portions and extending beyond the ends of said portions, and keeper bars positioned beyond the ends of said anchor portions and securing said base plates in spaced relation.

19. A resilient upright highway marker comprising a blade of flexible resilient material having a plurality of lower anchoring portions in the form of sheets, base plates for said anchoring portions, each of said plates comprising connected upper and lower leaves embracing and firmly securing the associated anchor portions and extending beyond the ends of said portions, keeper bars positioned beyond the ends of said anchor portions and securing said base plates in spaced relation, and means for securing said keeper bars to the pavement.

In witness whereof, we hereunto subscribe our names this 12th day of April, A. D. 1929.

MELVIN E. HARTZLER.
EDGAR P. ROMILLY.